BEST AVAILABLE COPY

T856,0

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 26, 1968

T856,039

856 O.G. 1019

561,732

EXHAUST DYEING PROCESS FOR DYES CONTAINING 2,3-DICHLORO-6-QUINOXALINECARBONYLAMINO OR VINYL SULFONE REACTIVE GROUPS

Victor Tullio, Wilmington, Del., assignor to E. I. du Pont de Nemours and Company, Wilmington, Del., a corporation of Delaware

Filed June 30, 1965. Published Nov. 26, 1968

Class 8—54.2

No Drawing. 19 Pages Specification

In a process for exhaust dyeing cellulosic fibers with fiber-reactive dyes having a 2,3-dichloro-6-quinoxalinecarbonylamino or a vinyl sulfone group, wherein said process salt is added to the dye liquor to promote exhaustion of dye unto the fiber and alkali is added to the dye liquor to promote interaction of dye and fiber, the improvement which comprises adding simultaneously and stepwise to the dye liquor a mixture of salt, for example, sodium chloride, and an alkali selected from sodium bicarbonate, sodium carbonate and trisodium phosphate.

T856039 *****
NO OR CLASSIF *****